United States Patent [19]

Cantoni

[11] Patent Number: 4,664,088
[45] Date of Patent: May 12, 1987

[54] FUEL FEED DEVICE, PARTICULARLY FOR DIESEL ENGINES, WITH FUEL FILTERING, HEATING AND EMULSIFYING MEMBERS

[75] Inventor: Angelo Cantoni, Rome, Italy

[73] Assignee: Ital Idee s.r.l., Rome, Italy

[21] Appl. No.: 871,898

[22] Filed: Jun. 9, 1986

[30] Foreign Application Priority Data

Jun. 10, 1985 [IT] Italy ............................. 48186 A/85

[51] Int. Cl.⁴ .......................................... F02M 31/00
[52] U.S. Cl. ..................................... 123/557; 210/86
[58] Field of Search ................ 123/557; 210/86, 185, 210/186, 136, 313, 306; 219/205

[56] References Cited

U.S. PATENT DOCUMENTS

| | | | |
|---|---|---|---|
| 4,338,907 | 7/1982 | Lindbeck | 123/557 |
| 4,364,365 | 12/1982 | Gendron | 123/557 |
| 4,481,931 | 11/1984 | Bruner | 123/557 |
| 4,553,697 | 11/1985 | Nothen | 123/557 |
| 4,579,653 | 4/1986 | Davis | 210/86 |
| 4,600,825 | 7/1986 | Blazejousky | 219/205 |

Primary Examiner—Ronald B. Cox
Attorney, Agent, or Firm—Fleit, Jacobson, Cohn & Price

[57] ABSTRACT

This invention relates to a fuel feed device for diesel engines, which comprises an intake filter disposed in the fuel tank and with a casing for heat transfer between the recycled fuel and intake fuel by means of mixing, and a filtering, heating and emulsifying unit disposed downstream of the fuel feed pump before the engine injection pumping unit, said filtering, heating and emulsifying unit comprising a filtering element, a surface heat exchanger through which the engine cooling liquid flows, and an emulsifying member of the flow disintegration type.

10 Claims, 3 Drawing Figures

FUEL FEED DEVICE, PARTICULARLY FOR DIESEL ENGINES, WITH FUEL FILTERING, HEATING AND EMULSIFYING MEMBERS

BACKGROUND OF THE INVENTION

The present invention relates to a fuel feed device, particularly for diesel engines, with fuel filtering, heating and emulsifying members.

In internal combustion diesel engines, the presence of impurities and water in the fuel can seriously compromise the proper operation and life of the constituent members of the fuel injection equipment.

A further drawback, in the case of low ambient temperature, is that the paraffinic components contained in the diesel oil separate with subsequent formation of paraffin crystals able to clog the fuel circuit ducts.

The solid impurities present in the diesel oil are currently filtered by disposing several filters along the fuel feed pipe, but these filters are unable to prevent the formation of paraffin crystals or to remove the water from the diesel oil.

This water can be either already present in the diesel oil when it is supplied or can collect subsequently following condensation of the moisture in the air contained in the tank.

The presence of large water droplets in the fuel feed circuit leads to several difficulties, such as low efficiency, starting difficulties and surface oxidation. In addition, this water tends to accumulate in the said filters, making it necessary to periodically bleed them.

The problem therefore arises of providing a fuel feed device which allows fuel filtering and heating while preventing water accumulation by dispersing it together with the fuel, so as not to reduce the engine efficiency, but instead to utilise the positive contribution made by the water if emulsified in fine dispersion within the fuel.

SUMMARY OF THE INVENTION

These results are attained according to the present invention by a fuel feed device for diesel engines, which comprises an intake filter disposed in the fuel tank at the mouth of the intake pipe thereof, and a filtering, heating and emulsifying unit disposed downstream of the fuel feed pump before the injection pumping unit, wherein the filtering, heating and emulsifying unit comprises a surface heat exchange member traversed by a heating fluid in the form of the engine cooling liquid, a filtering element, and an emulsifying member disposed at the inlet mouth of the fuel outlet pipe from said filtering, heating and emulsifying unit, means being provided for controlling the temperature to which the fuel is heated.

In particular, the filtering, heating and emulsifying unit consists of a closed casing to which a fuel inlet pipe and a fuel outlet pipe are connected and which is subdivided by the filtering element into two separate chambers in communication with the fuel inlet pipe and fuel outlet pipe respectively, in said closed casing there being provided a coil connected to the engine cooling liquid circuit and run by the cooling liquid, the fuel outlet pipe from the casing being provided with a dip tube extending from the bottom thereof and fitted at its lower end with an emulsifying member in the form of a porous element able to finely disintegrate the liquid which passes through it.

The filtering element consists of a paper filter cartridge which can be replaced when clogged.

The closed casing of the filtering, heating and emulsifying unit comprises in its lower part, within the chamber communicating with the fuel outlet pipe, a recess forming a collection sump into which there opens the lower end of the dip tube provided with the emulsifying member, which is conveniently in the form of a sintered bronze capsule of predetermined particle size and porosity.

The filtering, heating and emulsifying unit is provided with means for sensing the pressure drop of the traversing fuel and arranged to provide a signal if a predetermined pressure drop between the unit inlet and outlet is exceeded.

The filtering, heating and emulsifying unit is also provided with a temperature sensor disposed in the vicinity of the fuel outlet pipe and measuring the temperature of the outlet fuel. A pipe which connects the coil to the engine cooling liquid circuit is also provided with an automatic flow regulator valve controlled by the temperature sensor and arranged to maintain the temperature of the fuel leaving the unit constant.

Conveniently, the temperature sensor is disposed in a recess communicating with the fuel outlet pipe from the filtering, heating and emulsifying unit, in a position spaced apart from the outlet flow such as to ensure a delay in the response of the sensor to changes in the outlet fuel temperature.

The intake filter at the inlet mouth of the fuel intake pipe consists of a lowerly open casing into which the pipe which recycles excess fuel to the tank opens and from which the fuel intake pipe draws by way of a filtering element, heat transfer being attained within said casing by direct mixing between the heated recycled fuel and the intake fuel.

Conveniently, particularly if of considerable length such as to cause high heat loss, the fuel intake pipe from the tank and the excess fuel recycle pipe to the tank are disposed side-by-side and provided with common insulation at least over a part of their path from the tank to the engine.

DESCRIPTION OF THE DRAWINGS

Further details will be apparent from the description of one embodiment of the invention given hereinafter with reference to the accompanying drawings, in which.

DETAILED DESCRIPTION

Figure 1:
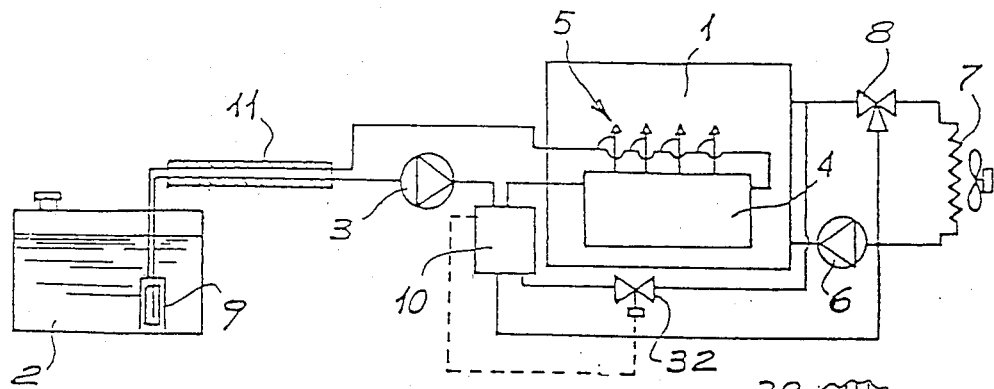
FIG. 1 is an overall scheme of a diesel engine with the feed circuit and cooling circuit according to the invention.

As shown in FIG. 1, fuel is fed to the internal combustion engine 1 from the tank 2 by means of a feed pump 3.

The engine 1 is provided with a pumping unit 4 connected to the injectors 5 and possesses a cooling circuit comprising a circulation pump 6, a radiator 7 and a thermostatic valve 8.

Along the fuel feed pipe from the tank 2 to the engine 1 there is disposed an intake filter 9 and a filtering, heating and emulsifying unit 10. The outward and return pipes feeding the fuel to and from the engine are conveniently provided with common insulation 11.

Figure 2:
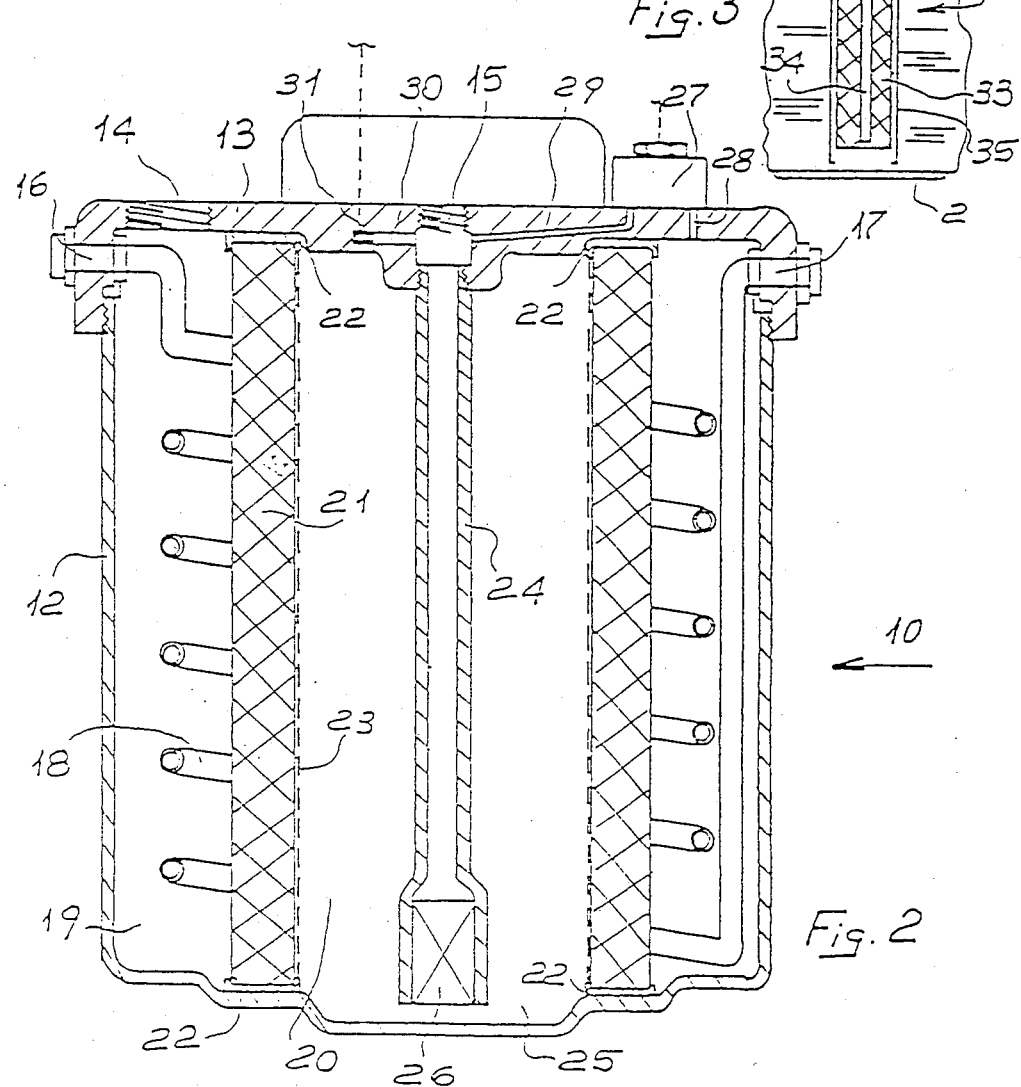
FIG. 2 is a section through the filtering, heating and emulsifying unit of the invention.

The filtering, heating and emulsifying unit 10, disposed conveniently downstream of the feed pump 3, is shown in section in FIG. 2 and consists of a casing 12 with a closure cover 13 provided with threaded connectors 14, 15, for connecting respectively the inlet and outlet pipes for the fuel fed by the pump 3. The cover 13 is also provided with inlet and outlet connectors 16 and 17 for the engine cooling water which circulates through the coil 18. A filter cartridge 21 enclosed between elastic gaskets 22 and supported by the grid 23 divides the interior of the filtering, heating and emulsifying unit 10 into two coaxial chambers 19, 20 communicating respectively with the connector 14 of the inlet pipe and the connector 15 of the outlet pipe.

The outlet pipe connector 15 is connected to a dip tube 24 extending as far as the lower zone of the casing 12, which comprises a recess forming the collection sump 25. At the lower end of the pipe 24 there is an emulsifier 26 formed from a sintered bronze capsule having a particle size and porosity such as to emulsify the water contained in the diesel oil by minute subdivision of the flow.

A pressure difference sensor 27 communicates with the inlet chamber 19 and the outlet pipe connector 15 or chamber 20 by way of respective ducts 28, 29, and enables an indication to be provided, for example on the vehicle dashboard, when the filter cartridge 21 is clogged to an extent requiring its replacement.

The outlet pipe connector 15 is also provided with a recess 30 in which a temperature sensor 31 is disposed in a position distant from the outlet fuel flow so as to ensure a delayed response, and is arranged to operate a valve 32 disposed in the pipe feeding the engine cooling liquid to the coil 18, so as to keep the temperature of the outlet fuel from the unit 10 constant.

Figure 3:
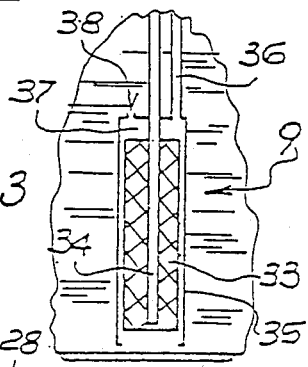
FIG. 3 is a detailed view of the fuel tank showing the intake filter of the invention.

The tank 2 houses the intake filter 9, shown in greater detail in FIG. 3. It consists of a filter mesh 33 disposed around the intake pipe 34 and enclosed by a lowerly open casing 35 into which the fuel return pipe 31 opens, and which forms a vessel 37 surrounds by the tank 2. A vent 38 allows any gas formed in the feed circuit to be released. In this manner, because of the small volumes concerned, the vessel 37 provides effective heat transfer between the hot fuel recycled to the tank and the engine feed fuel, which thus undergoes an initial heating.

Heat transfer between the recycled fuel and the engine feed fuel is further facilitated by the side-by-side arrangement of the respective pipes provided with common insulation 11, particularly if said pipes are of considerable length.

The purpose of the filtering, heating and emulsifying unit 10 is to heat the fuel, using for this purpose the engine cooling liquid circulating at high temperature and feeding it to the coil 18 to raise the temperature of the fuel to a predetermined value controlled by the temperature sensor 31 and valve 32 (at about 40°-50° C.) at which there is no paraffin separation or paraffin crystal formation in the diesel oil.

The position of the sensor 31, which provides a delayed response depending on the distance of the sensor from the main flow zone, allows the higher temperature of the cooling liquid on engine start-up, caused by the temporary exclusion of the radiator 7 from the circuit by means of the thermostatic valve 8, to be utilised to transfer a greater quantity of heat to the fuel and dissolve any solid paraffin formations.

The filter cartridge 21, conveniently of paper, is of known type and can be replaced when its degree of clogging exceeds a predetermined value indicated by the sensor 27.

Particularly during rest periods, the water contained in the fuel within the casing 12 tends to decant, and this water collects in the collection sump 25. The dip tube 24 enables it both to be directly withdrawn so preventing its accumulation and the need to bleed it off, and to be dispersed with the fuel fed to the engine.

The water present is thus emulsified by the emulsifier 26, to obtain a fine dispersion of the secondary liquid, namely the water, in the main liquid, namely the diesel oil. The water, disintegrated by the emulsifier 26 into droplets having a diameter of a few microns and enclosed within the diesel oil droplets, does not come into contact with the walls of the pipes through which the fuel passes, thus preventing the formation of the oxides which normally form when the water comes into contact with the metal surfaces.

Furthermore, the small quantity of water uniformly distributed and atomised within the diesel oil, and the fine atomisation of the diesel oil itself by the action of the emulsifier, contribute to improved combustion and greater efficiency.

Various modifications can obviously be made to the feed device of the invention, but without leaving the scope of protection thereof.

What is claimed is:

1. A engine feed device, comprising a fuel tank having an intake pipe, an intake filter disposed in the fuel tank at the mouth of the intake pipe thereof a fuel feed pump feeding fuel from said intake pipe to an injection pumping unit, and a filtering, heating and emulsifying unit disposed downstream of the fuel feed pump before the injection pumping unit, wherein the filtering, heating and emulsifying unit comprises a surface heat exchange member traversed by a heating fluid in the form of the engine cooling liquid, a filtering element, and an emulsifying member disposed at the inlet mouth of the fuel outlet pipe from said filtering, heating and emulsifying unit, means being provided for controlling the temperature to which the fuel is heated.

2. A device according to claim 1, characterised in that the filtering, heating and emulsifying unit comprises a closed casing to which a fuel inlet pipe and a fuel outlet pipe are connected and which is subdivided by a filtering element into two separate chambers in communication with the fuel inlet pipe and fuel outlet pipe respectively, in said closed casing there being provided a coil connected to the engine cooling liquid circuit and run by the cooling liquid, the fuel outlet pipe from the casing being provided with a dip tube extending from the bottom of said casing and fitted at its lower end with an emulsifying member in the form of a porous element able to finely disintegrate the liquid which passes through it.

3. A device according to claim 2, characterised in that the filtering element consists of a paper filter cartridge which can be replaced when clogged.

4. A device according to claim 3, characterised in that the closed casing of the filtering, heating and emulsifying unit comprises in its lower part, within the chamber communicating with the fuel outlet pipe, a recess forming a collection sump into which there opens the lower end of the dip tube provided with the emulsifying member.

5. A device according to claim 4, characterised in that the emulsifying member consists of a sintered bronze capsule of predetermined particle size and porosity.

6. A device according to claim 5, characterised in that the filtering, heating and emulsifying unit is provided with means for sensing the pressure drop of the traversing fuel and arranged to provide a signal if a predetermined pressure drop between the unit inlet and outlet is exceeded.

7. A device according to claim 6, characterised in that the filtering, heating and emulsifying unit is provided with a temperature sensor disposed in the vicinity of the fuel outlet pipe and measuring the temperature of the outlet fuel, a pipe connecting the coil to the engine cooling liquid circuit being provided with an automatic flow regulator valve controlled by the temperature sensor and arranged to maintain the temperature of the fuel leaving the unit constant.

8. A device according to claim 7, characterised in that the temperature sensor is disposed in a recess communicating with the fuel outlet pipe from the filtering, heating and emulsifying unit, in a position spaced apart from the outlet flow such as to ensure a delay in the response of the sensor to changes in the outlet fuel temperature.

9. A device according to claim 8, further comprising a pipe which recycles excess fuel to the tank and characterised in that the intake filter at the mouth of the fuel intake pipe consists of a casing open at its lower end into which the pipe which recycles excess fuel to the tank opens and from which the fuel intake pipe draws by way of a filtering element, heat transfer being attained within said casing by direct mixing between the heated recycled fuel and the intake fuel.

10. A device according to claim 1, characterised in that the fuel intake pipe from the tank and the excess fuel recycle pipe to the tank are disposed side-by-side and provided with common insulation at least over a part of their path from the tank to the engine.

* * * * *